(12) United States Patent
Chian et al.

(10) Patent No.: US 7,317,265 B2
(45) Date of Patent: Jan. 8, 2008

(54) METHOD AND APPARATUS FOR POWER MANAGEMENT

(75) Inventors: Brent Chian, Plymouth, MN (US); Timothy J. Nordberg, Bloomington, MN (US); Jonathan S. McDonald, Bloomington, MN (US)

(73) Assignee: Honeywell International Inc., Morristown, NJ (US)

( * ) Notice: Subject to any disclaimer, the term of this patent is extended or adjusted under 35 U.S.C. 154(b) by 1147 days.

(21) Appl. No.: 10/382,303

(22) Filed: Mar. 5, 2003

(65) Prior Publication Data

US 2004/0176859 A1    Sep. 9, 2004

(51) Int. Cl.
G05F 3/06 (2006.01)
H01L 35/30 (2006.01)

(52) U.S. Cl. .................. 307/151; 136/205; 136/224
(58) Field of Classification Search ........... 307/151; 122/13.01; 136/200, 205, 236.1, 291, 224; 60/643
See application file for complete search history.

(56) References Cited

U.S. PATENT DOCUMENTS

| | | |
|---|---|---|
| 4,696,639 A | 9/1987 | Bohan, Jr. |
| 4,734,658 A | 3/1988 | Bohan, Jr. |
| 4,770,629 A | 9/1988 | Bohan, Jr. |
| 4,834,284 A | 5/1989 | Vandermeyden ............ 236/20 |
| 4,984,981 A | 1/1991 | Pottebaum |
| 5,660,328 A | 8/1997 | Momber |
| 5,797,358 A | 8/1998 | Brandt et al. |
| 5,931,655 A | 8/1999 | Maher, Jr. .................. 431/14 |
| 6,059,195 A | 5/2000 | Adams et al. ............... 236/20 |
| 6,192,687 B1 * | 2/2001 | Pinkerton et al. ............ 60/646 |
| 6,237,855 B1 | 5/2001 | Stickney et al. ............. 237/8 |
| 6,261,087 B1 | 7/2001 | Bird et al. |
| 6,293,471 B1 | 9/2001 | Stettin et al. |
| 6,701,874 B1 * | 3/2004 | Schultz et al. ............ 122/14.2 |
| 2001/0031138 A1 | 10/2001 | Troost, IV |
| 2002/0132202 A1 | 9/2002 | Clifford ................... 431/264 |

* cited by examiner

Primary Examiner—Shawn Riley (57) ABSTRACT

A system in accordance with the invention includes a power converter for converting a thermally generated voltage where the power converter includes a low-voltage direct current to direct current voltage converter (DC-DC converter) and a high-efficiency DC-DC converter coupled with the low-voltage DC-DC converter. The system also includes a charge storage circuit coupled with the low-voltage DC-DC converter and the high-efficiency DC-DC converter for storing converted electrical energy and a programmable controller circuit. The programmable controller circuit is coupled with the high-efficiency DC-DC converter, the low-voltage DC-DC converter, and the charge storage circuit such that the controller circuit substantially controls operation of the system when the voltage potential of the converted electrical energy stored by the charge storage circuit is greater than a brown out voltage of the controller.

42 Claims, 5 Drawing Sheets

METHOD AND APPARATUS FOR POWER MANAGEMENT

FIELD

The present invention relates to gas powered appliances and, more particularly, to power management for thermally powered control circuits in such appliances.

BACKGROUND

Gas-powered appliances typically have some control system included for controlling the operation of the appliance. In this context, a gas-powered appliance may be a water heater, a fireplace insert or a furnace, as some examples. Also in this context, "gas-powered" typically means natural gas or liquid propane gas is used as a primary fuel source. Current control systems used in gas-powered appliances are typically powered by a source external to the appliance, or take the form of a thermo-mechanical system, of which both approaches have certain disadvantages.

In this respect, appliances with external power sources may be difficult to use in certain situations due to availability and/or proximity of a suitable power source. Additionally, such systems typically do not function in the event of a power outage, which is undesirable. While a thermo-mechanical back-up control system may be included in such an appliance, that approach may be overly redundant and cost prohibitive in a commercial application.

Likewise, gas-powered appliances that employ thermo-mechanical controls, while not using an external power supply, also have certain disadvantages. Such thermo-mechanical controls are typically inaccurate due to machining tolerances, mechanical hysteresis and the use of only a single temperature sensing location due the impracticability of multiple sensor configurations. Based on the foregoing, alternative approaches may be desirable.

SUMMARY

A system in accordance with the invention includes a power converter for converting a thermally generated voltage. The power converter includes a low-voltage direct current to direct current voltage converter (DC-DC converter) and a high-efficiency DC-DC converter coupled with the low-voltage DC-DC converter. The system also includes a charge storage circuit for storing converted electrical energy and a programmable controller circuit. The charge storage circuit may be coupled with the low-voltage DC-DC converter and the high-efficiency DC-DC converter. The programmable controller circuit is coupled with the high-efficiency DC-DC converter, the low-voltage DC-DC converter, and the charge storage circuit. According to an embodiment of the invention, the controller circuit substantially controls operation of the system when the voltage potential of the converted electrical energy stored by the charge storage circuit is greater than a brown-out voltage of the controller.

BRIEF DESCRIPTION OF THE DRAWINGS

The subject matter regarded as the invention is particularly pointed out and distinctly claimed in the concluding portion of the specification. The invention, however, as to both organization and method of operation, together with features and advantages thereof, may best be understood by reference to the following detailed description when read with the accompanying drawings in which:

DETAILED DESCRIPTION

In the following detailed description, numerous specific details are set forth in order to provide a thorough understanding of the invention. However, it will be understood that the present invention may be practiced without these specific details. In other instances, well-known methods, procedures, components and circuits have not been described in detail, so as not to obscure the present invention.

As was previously indicated, current approaches for control of gas-powered devices, such as gas-powered appliances, may have certain drawbacks. Again, in this context, gas-powered typically means natural gas or liquid propane gas is employed as a primary fuel source. For the sake of illustration, the embodiments of the invention discussed herein will be described with reference to a water heater appliance. Of course, the invention is not limited in scope to use in a water heater, and other applications are possible. For example, embodiments of the invention may be employed in a gas-powered furnace, a gas-powered fireplace, or any number of other gas-powered devices.

Figure 1:
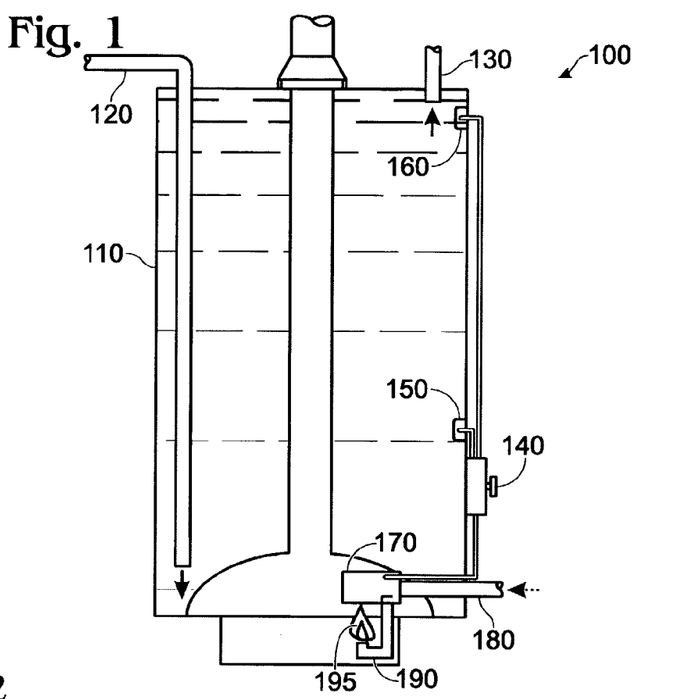
FIG. 1 is a drawing illustrating a water heater according to an embodiment of the invention.

Referring to FIG. 1, a drawing illustrating an embodiment of a water heater 100 in accordance with the invention is shown. Water heater 100 may include a storage tank 110 for storing water that has been, or is to be heated. Water heater 100 may also include a water supply feed pipe (typically cold water) 120, and a hot water exit pipe 130. Additionally, water heater 100 may include a selectable input device/control circuit 140, and temperature sensors 150 and 160. Information, such as water temperature within tank 110 and/or a preferred water temperature may be communicated, respectively, by temperature sensors 150 and 160 and the input device of input device/control circuit 140 to the control circuit of input device/control circuit 140. Typically, such information is communicated using electrical signals. In this regard, a thermo-electric device 170 may power input device/control circuit 140. While the invention will be described in further detail with respect to FIGS. 2-6, briefly, employing a thermally powered control circuit, such as input device/control circuit 140, with water heater 100 overcomes at least some of the foregoing described disadvantages, such as use of external power.

For water heater 100, a gas supply line 180 and a pilot burner/pilot gas valve 190 may also be coupled with input device/control circuit 140. In this regard, burner 190 may produce a pilot flame 195. Thermal energy supplied by pilot flame 195 may be converted to electric energy by thermo-electric device 170. This electrical energy may then be used by thermally powered input device/control circuit 140 to operate water heater 100, as is described in further detail hereinafter. Water heater 100 may further include a main burner/main burner gas valve (not shown), which may provide thermal energy for heating water contained within tank 110.

Figure 2:
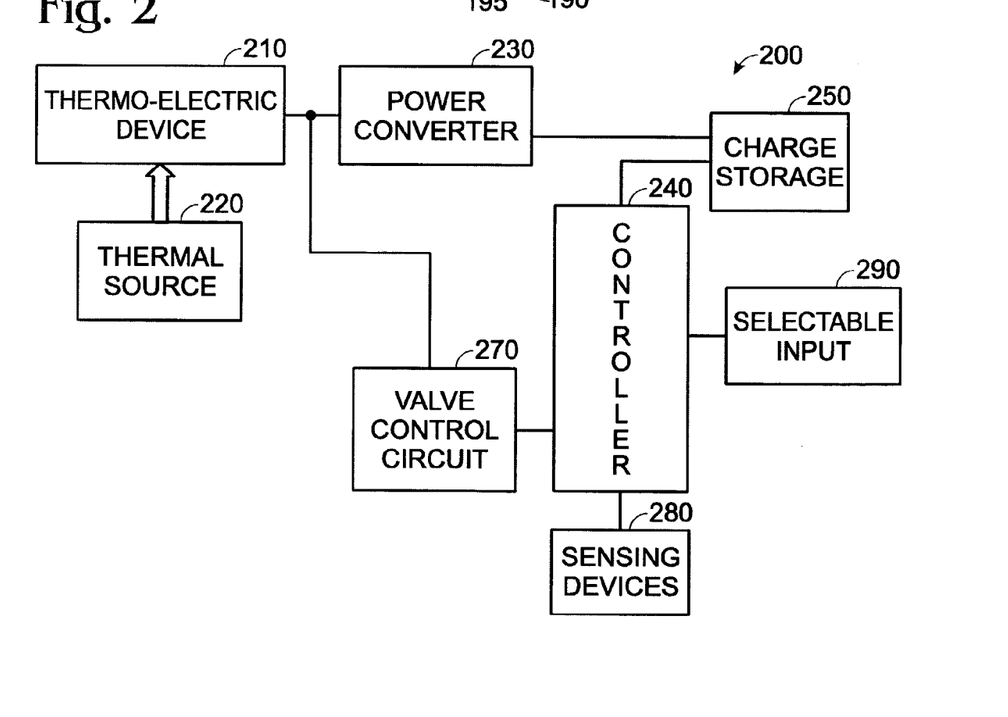
FIG. 2 is a block diagram of a thermally powered control circuit and power management system according to an embodiment of the invention.

Referring to FIG. 2, a block diagram of an embodiment of a thermally powered control circuit 200 including a power management system in accordance with the invention is shown. Circuit 200 may be used in water heater 100, though the invention is not so limited. Features and aspects of the embodiment shown in FIG. 2 will be discussed briefly with reference to circuit 200, with a more detailed description of power management systems in accordance with the invention being set forth below with reference to FIGS. 3-6.

In this regard, circuit 200 may include a thermo-electric device 210 that is in thermal communication with a thermal source 220. In this context, thermal communication typically means that thermo-electric device 210 and thermal source 220 are in close enough physical proximity with each other, such that thermal energy generated by thermal source 220 may be absorbed by, or communicated to, thermo-electric device 210. In this respect, thermal energy communicated to thermo-electric device 210 from thermal source 220, in turn, may result in thermo-electric device 210 producing an electric voltage potential.

As is shown in FIG. 2, thermo-electric device 210 may be coupled with power converter 230. Power converter 230, which will be discussed in further detail below, may modify the voltage potential produced by thermo-electric device 210. Typically, because the voltage potential produced by thermo-electric device 210 is lower than desired for operating most circuit components, power converter 230 may be a step-up power converter. Power converter 230 may be further coupled with a controller 240 and a charge storage device 250. While the invention is not limited in scope to the use of any particular controller, controller 240 may take the form of an ultra-low power microcontroller. Such microcontrollers are available from Texas Instruments, Inc., 12500 TI Boulevard, Dallas, Tex. 75243 as the MSP430 product family, though, as previously indicated, alternatives may exist. Charge storage device 250 may comprise circuit components, such as, for example, capacitors to store charge for use by controller 240, and for use in stepping up the voltage potential generated by thermo-electric device 210.

Circuit 200 may also include a valve control circuit 270. Valve control circuit 270 may be coupled with controller 240 such that controller 240 may initiate opening and closing of one or more gas valves associated with valve control circuit 270, during normal operation of, for example, water heater 100. Methods that may be executed by controller 240 for operating, for example, water heater 100 are described in commonly owned patent application Ser. No. 10/382,056, Honeywell docket number H0003053, the entire disclosure of which is incorporated by reference herein.

Circuit 200 may still further include one or more sensing devices 280 and an input selection device 290, which may be coupled with controller 240. Sensing devices 280 may take the form of negative temperature coefficient (NTC) thermistors, which, for the embodiment illustrated in FIG. 1, may sense water temperature within storage tank 110. Controller 240 may then compare information received from sensing devices 280 with a threshold value that is based on a setting of selection device 290. Based on this comparison, controller 240 may initiate valve control circuit 270 to open a main burner valve to heat water within water heater 100. Alternatively, for example, controller 240 may initiate valve control circuit 270 to close a main burner valve to end a heating cycle in water heater 100. As was previously indicated, the invention is not limited to use with a water heater, and may be used in other applications, such as with furnaces or fireplaces. In such applications, sensing devices 280 may sense room temperature, as opposed to water temperature.

Figure 3:
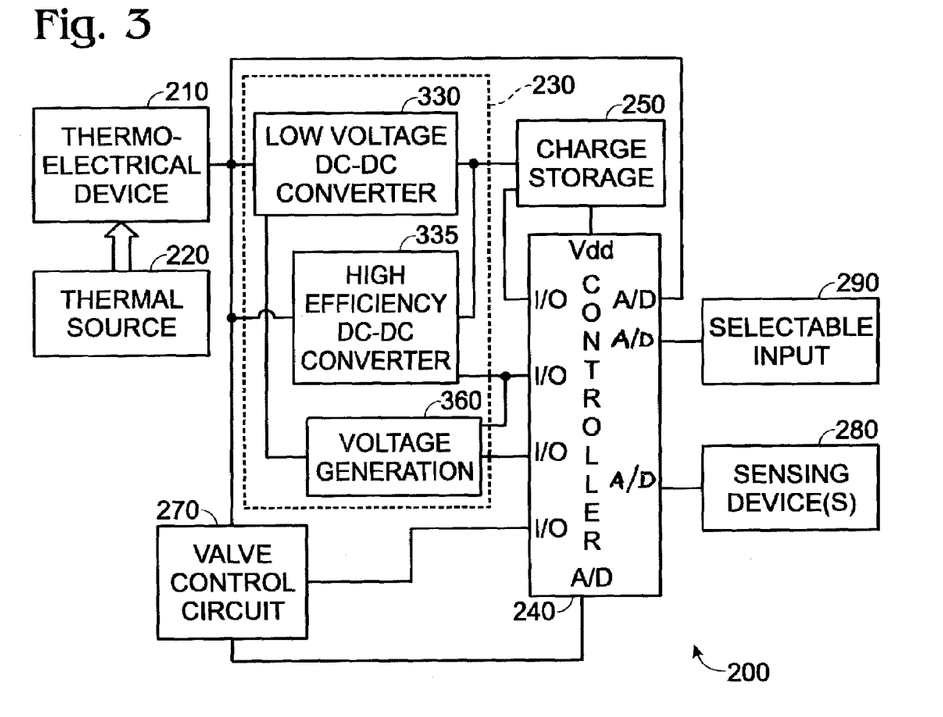
FIG. 3 is a more detailed block diagram of the circuit and system shown in FIG. 2; showing the components of an embodiment of a power management system in accordance with the invention in more detail.

Referring now to FIG. 3, another block diagram of circuit 200 showing power converter 230 in more detail is depicted. For ease of comparison, those blocks of circuit 200, as shown in FIG. 3, that correspond with blocks of circuit 200, as shown in FIG. 2, are indicated using the same reference numbers. As can be seen in FIG. 3, power converter 230 may comprise a low voltage direct current to direct current voltage converter (DC-DC converter) 330, a high-efficiency DC-DC converter 335 and a voltage generation circuit 360. Each of these blocks is discussed in more detail with respect to FIG. 4. Briefly, however, low-voltage DC-DC converter 330, high-efficiency DC-DC converter 335 and voltage generation circuit 360 may operate in conjunction with charge storage circuit 250 and controller 240 as an embodiment of a power management system in accordance with the invention for thermally powered control circuit 200.

Figure 4:
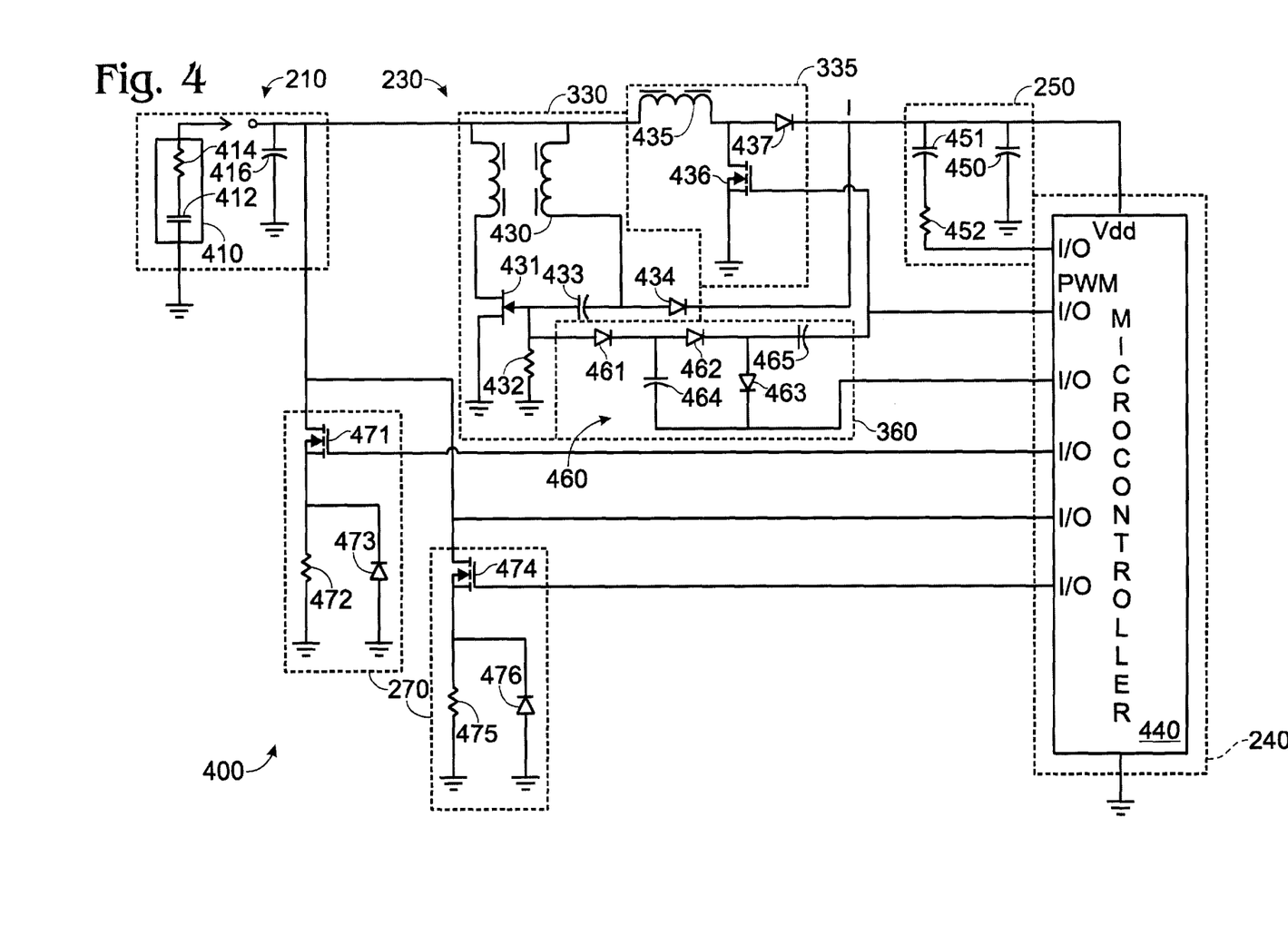
FIG. 4 is a schematic diagram illustrating portions of a power management system according to another embodiment of the invention.

Referring now to FIG. 4, a schematic diagram of a thermally powered control circuit 400 in accordance with the invention, including a power management system in accordance with the invention is shown. It is noted that circuit 400 is similar to circuit 200 depicted in FIGS. 2 and 3 in a certain respects. In this regard, the elements of circuit 400 that correspond with elements of circuit 200 have been designated with the same reference numbers. It will be appreciated, however, that the embodiments described herein are exemplary and the invention is not limited in scope to these particular embodiments.

Circuit 400 comprises thermo-electric device 210, which for this embodiment may take the form of thermopile 410 and capacitor 416. Thermopile 410, for purposes of illustration, comprises battery 412, which represents the open-circuit thermopile voltage, and resistor 414, which represents the internal resistance of thermopile 410. Capacitor 416 may provide wave shaping for the thermal voltage generated by thermopile 410 as well as improving the overall efficiency of circuit 400.

Thermopile device 410 may be coupled with power converter 230, specifically low-voltage DC-DC converter 330 and high-efficiency DC-DC converter 335, for converting the thermally generated voltage. For circuit 400, low-voltage DC-DC converter 330 may take the form of a DC-DC converter as is described in U.S. Pat. No. 4,734,658 to Bohan. In this respect, low-voltage DC-DC converter 330 may comprise a transformer 430, an embodiment of which is described below with reference to FIG. 5. Low-voltage DC-DC converter 330 may also comprise an electronic switch for completing a positive feedback loop that facilitates oscillation of DC/DC converter 330 For circuit 400, this switch may take the form of an n-channel junction field effect transistor or an n-channel depletion mode field effect transistor (collectively FET) 431. FET 431 may also be used to disable low voltage DC/DC converter 330, as will be described in further detail below. Low-voltage DC-DC converter 330 may also comprise a capacitor 433, transformer 430, FET 431, and capacitor 433 form a low-voltage, self-starting oscillator. In this respect, when the input voltage to transformer 430 has sufficient potential (approximately 100 mV), this oscillator begins to oscillate.

Low-voltage DC-DC converter 330 further includes a rectifying diode 434 with its anode coupled with the positive terminal of the secondary windings of transformer 430 and capacitor 434. Because the voltage generated by thermopile 410 is relatively low as compared to the desired operation voltage of the circuit elements of circuit 400, transformer 430 may have a ratio of turns of its primary windings to turns of the secondary windings of approximately one to thirty in order to facilitate stepping up the thermal voltage.

As shown in FIG. 4, power converter 230 may also comprise high-efficiency DC-DC converter 335, which may be coupled with thermo-electric device 210 and low-voltage DC-DC converter 330. While these two converters are both electrically connected to thermo-electric device 210 at the same electrical node, they have no interaction with one another with respect to conversion of the thermal voltage generated by thermo-electric device 210. For this particular embodiment, high-efficiency DC-DC converter 335 may take the form of a boost converter, which comprises an inductor 435 coupled with thermo-electric device 210. High-efficiency DC-DC converter 335 may further comprise a field effect transistor (FET) switch device 436 coupled with inductor 435 and a controller 240, which is described further hereinafter, and a rectifying diode 437 coupled with inductor 435 and switch 436.

For this embodiment, power converter 230 may also include voltage generation circuit 360, which for circuit 400 takes the form of a negative charge pump 460. Negative charge pump 460 may be coupled with the gate terminal of FET 431 and comprise diodes 461, 462 and 463 and capacitors 464 and 465. In operation, negative charge pump 460 may be pumped by controller 240 to disable low-voltage DC-DC converter 330 after high-efficiency DC-DC converter 335 is enabled, as will be discussed in more detail below with reference to FIG. 6.

Circuit 400 may also include charge storage circuit 250, which is coupled with power converter 230 and controller 240 to provide a power supply voltage (Vdd) to controller 240. Charge storage circuit 250, for this embodiment, comprises a first capacitor 450, a second capacitor 451, and a resistive element 452. Capacitor 450 is relatively small as compared to capacitor 451, typically one-tenth to one-hundredth the size. For example, for water heater 100, capacitor 450 may have a value of ten (10) microfarads (uf) and capacitor 451 may have a value of one hundred (100) uf to one (1) millifarad. Such a configuration may improve the start up time of circuit 400, as low-voltage DC-DC converter stores electrical energy only on smaller capacitor 450. In this regard, because such low-voltage DC-DC converters are typically not efficient and deliver relatively little power as compared to DC-DC converters that operate at high voltages, use of capacitors 450 and 451 in such a configuration may allow Vdd to be stepped up from the thermal voltage more quickly than if a single capacitor the size of capacitor 451 were used. It is noted that a method for charging capacitors 450 and 451 in accordance with the invention is discussed in detail with respect to FIG. 6, and will not be discussed here for the sake of brevity.

Circuit 400, as has been previously indicated, may also include controller 240, which may take the form of a programmable microcontroller 440. As was discussed above, microcontroller 440 may be an ultra-low power microcontroller. Microcontroller 440 may include an analog-digital conversion circuit, a timer circuit, a pulse-width modulated output channel, a power supply voltage sensing circuit, a temperature sensing circuit, and a low-voltage (brown-out) function mode. These features of microcontroller 440 may enable it to carry out the functions of power management for circuit 400.

In this respect, as is shown in FIG. 4, multiple I/O channels of microcontroller 440 maybe coupled with high-efficiency DC-DC converter 335, charge pump 460 and charge storage circuit 250. Microcontroller 440 may contain machine executable instructions for operating circuit 400. An embodiment of such a method is discussed below, as well as in commonly owned patent application Ser. No. 10/382,056, Honeywell docket number H0003053.

Circuit 400 may additionally comprise valve control circuit 270, which is coupled with microcontroller 440 and thermo-electric device 210. Valve control circuit 270 may comprise valve drivers 471 and 474, and associated gas valves which resistors 472 and 475 represent. Valve drivers 471 and 474 may take the form of FETs having their gate terminals coupled with I/O channels of microcontroller 440 such that gas valves 472 and 475 are opened and closed based, at least in part, on electrical signals generated by microcontroller 440. Valve control circuit 270 may further comprise free-wheeling diodes 473 and 476, which allow current from the inductance of valves 472 and 475, respectively, to free wheel when the valve drivers are turned off by microcontroller 440.

Figure 5:
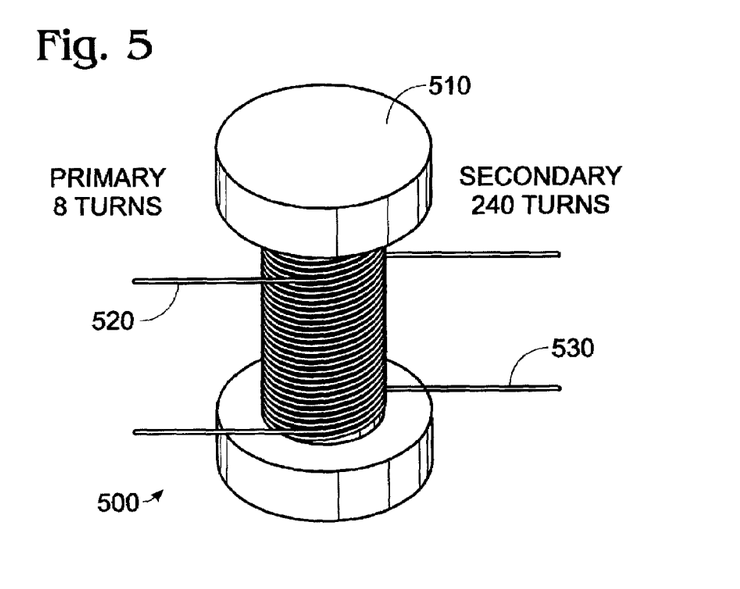
FIG. 5 is an isometric drawing illustrating a transformer that may be used with the embodiments of the invention shown in FIGS. 1-4.

Referring to FIG. 5, an isometric view of a transformer 500 that may be used with embodiments of power management systems in accordance with the invention, such as for transformer 430, is shown. The configuration of transformer 500 may have lower cost than other forms of transformers, such as transformers incorporating ferrite torroid magnetic cores. In this regard, transformer 500 may include a spool-shaped magnetic core 510. Transformer 500, due to the low input voltage generated by thermo-electric device 210, may include primary windings 520 wound directly on top of secondary windings 530 without the use of any separating dielectric material.

Figure 6A:
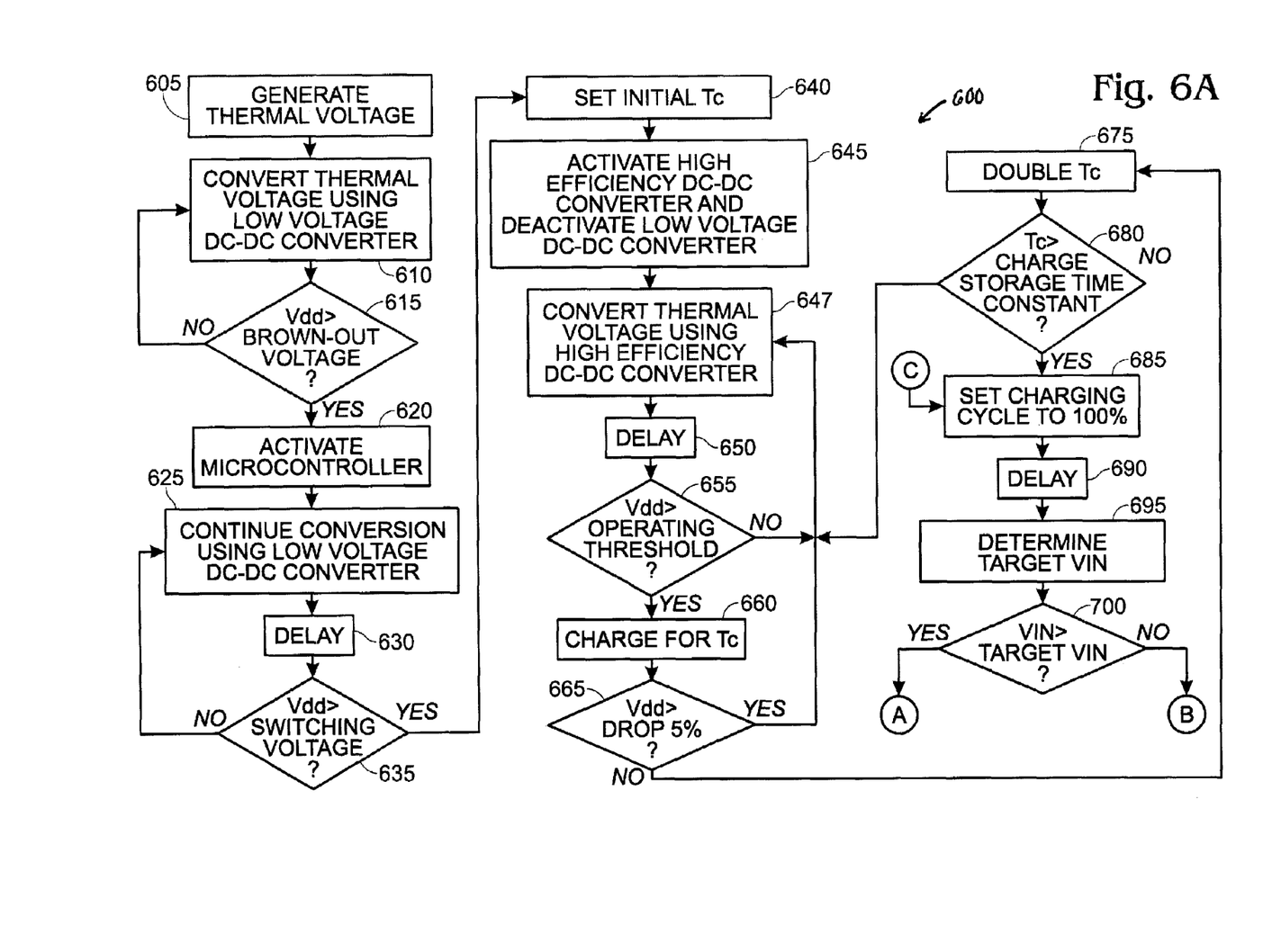
FIG. 6 is a flowchart illustrating a method of power management according to an embodiment of the invention.
Figure 6B:
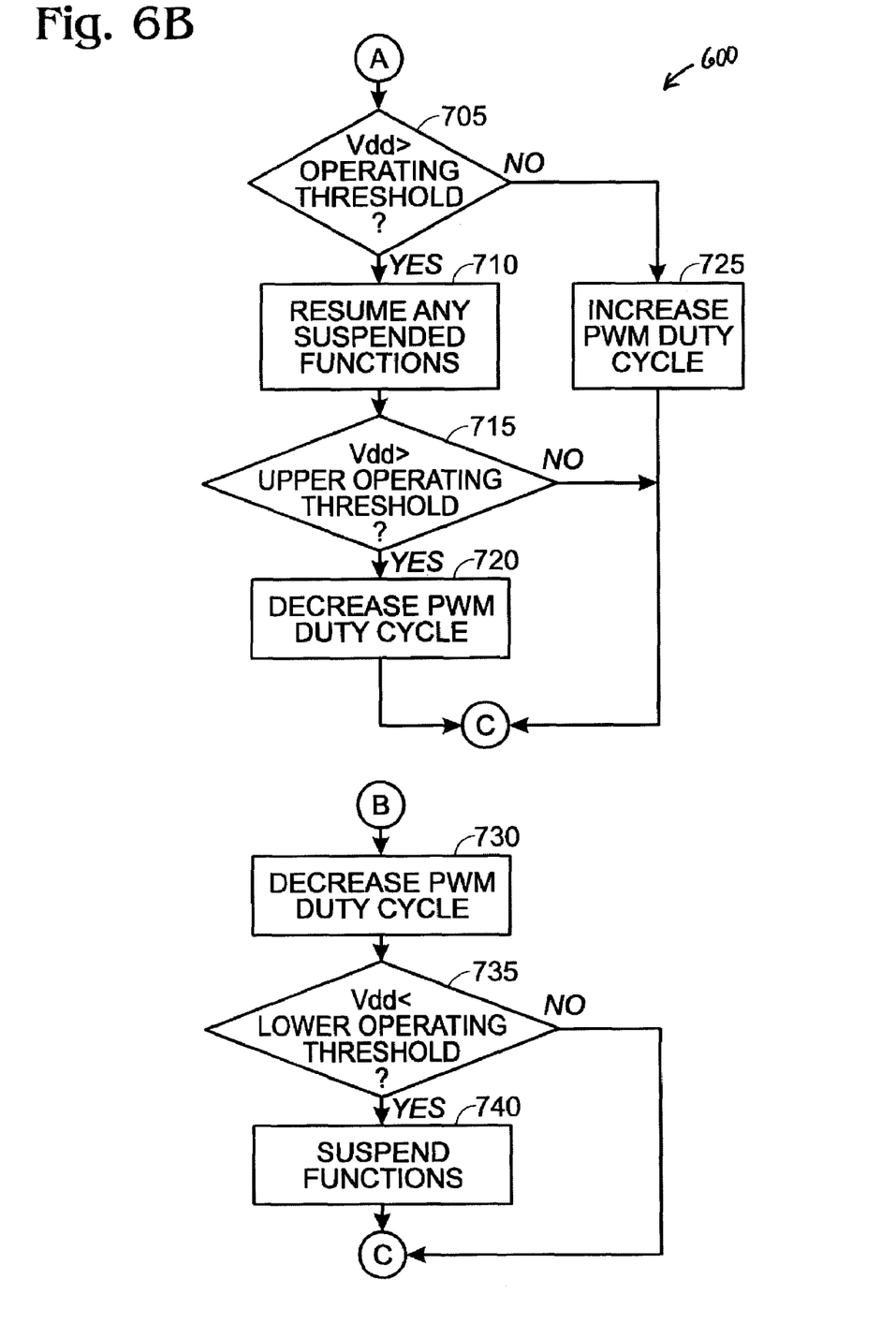

Referring now to FIG. 6, a flowchart illustrating an embodiment of a method 600 of power management in accordance with the invention is shown. While method 600 is discussed with further reference to FIG. 4, it is noted that the invention is not limited in scope to use with this particular circuit, as numerous alternatives exist.

Method 600 may include generating a thermal voltage at block 605, such as with thermo-electric device 210. The thermal voltage may then be converted, at block 610, using a low-voltage DC-DC controller, such as low-voltage DC-DC controller 330 and stored using a first charge storage device, such as capacitor 450. Such voltage conversion may continue until the power supply voltage (Vdd) of a controller, such as microcontroller 440, exceeds a brown-out voltage for the controller at block 615. When Vdd exceeds the brown-out voltage, the controller may then be activated in a low-power mode at 620. The low-voltage DC-DC converter may continue to convert the thermal voltage at block 625. After a predetermined delay interval at block 630, Vdd may then be compared with a switching voltage threshold for transistors included in the power management system, such as in circuit 400, at block 630. If Vdd has not yet reached the switching threshold voltage at block 630, the low-voltage DC-DC converter may continue to convert the thermal voltage at block 625 while the controller returns to its low power mode.

When Vdd exceeds the switching voltage threshold at block 635, an initial value for a variable charging time constant $T_C$ may be set. In the context of circuit 400, this initial value of $T_C$ may be approximately ten percent of a discharge time constant for capacitor 450 of charge storage circuit 250. The discharge time constant for capacitor 450 is the product of the resistance value of resistor 452 and the capacitance value of capacitor 450, ignoring any other impedance as a second order effect. At block 645, a high-efficiency boost converter, such as high-efficiency DC-DC converter 335, may be activated and the low-voltage DC-DC converter may be deactivated, such as by using charge pump 460 to supply negative voltage to the gate of FET 431.

The high-efficiency DC-DC converter may then continue conversion of the thermal voltage at block 647. After a predetermined delay interval at block 650, Vdd may then be compared with an operating voltage threshold at block 655. The operating voltage threshold may be a voltage that is a predetermined amount above the switching voltage threshold used at block 635 to allow for some drop in Vdd to occur during charging of a second charge storage device, such as capacitor 451. If Vdd is not above the operating voltage threshold at block 655, the controller may stay in the low-power mode and wait for Vdd to increase as a result of the high-efficiency DC-DC converter continuing to convert the thermal voltage at 647.

When Vdd exceeds the operating voltage threshold at 655, a value of Vdd may be retained by the controller, which may be termed an initial Vdd value. At block 660, the second charge storage device may be charged for the time interval $T_C$. In the context of circuit 400, charging the second charge storage device for time $T_C$ may comprise applying electrical ground to capacitor 451 via resistor 452 using an I/O channel of microcontroller 440. After time interval $T_C$, the I/O channel may be set to a high impedance state (e.g. tri-state). Vdd may then be sensed and compared with the retained initial value of Vdd at block 665. If the Vdd drop after charging the second charge storage device for time $T_C$ is greater than a predetermined percentage of the initial Vdd value, for example, five percent, the value of $T_C$ remains unchanged and voltage conversion using the high-efficiency DC-DC converter may continue at block 650.

If, however, the Vdd drop is less than the predetermined percentage of the initial Vdd value, the variable time constant $T_C$ may be doubled at 675. This process repeats from 655 to 675 until $T_C$ exceeds the charging time constant for the second charge storage device, which equals the product of the capacitance of capacitor 451 and the resistance of resistor 452. At that point, the I/O channel of the controller may indefinitely apply electrical ground (e.g. output low) to capacitor 451 via resistor 452.

Once this charging process has been completed, the power supply voltage (Vdd) of microcontroller 440 would typically be approximately equal to a power supply operating target voltage potential, the value of which may be included in microcontroller 440 for use by machine readable instructions used to implement such a method. Microcontroller 440 may then open valve 475 by applying voltage to the gate of transistor 474. Valve 474, which may be a valve for a pilot light in a water heater, would typically remain on as long as a sufficient current to hold the valve open is supplied by the voltage (Vin) generated by thermo-electric device 210. In this regard, microcontroller 440 may actively manage the operation of high-efficiency DC-DC converter 335 to maintain Vdd and Vin at desired operating voltage levels such that microcontroller 440 operates as expected and valve 475 remains open until such time microcontroller 440 closes valve 475 for safety, service or diagnostic purposes.

Once the electrical energy converted by low-voltage DC-DC converter 330 and high-efficiency DC-DC converter 335 has reached the operating voltage target for Vdd, microcontroller 440 may wait a predetermined period of time at 690. This period of time may vary based on the particular embodiment, however, in the case of a water heater embodiment, this time period may be approximately 10 milliseconds (ms). Such a time period may provide for detecting changes in Vdd and Vin without any large changes occurring in those voltages that may adversely affect the performance of the water heater.

The target Vin for valve 475 may be determined at 695. This target my be determined by microcontroller 440 sensing an operating temperature of valve 475 using a thermal diode included in microcontroller 440. In this regard, microcontroller 440 may be physically coupled with valve 475 so as to obtain a first order approximation of the operating temperature of valve 475. Such an operating temperature may be used by microcontroller 440, along with the resistance versus temperature characteristics of valve 475, to determine a target Vin value for valve 475 by using a lookup table included in microcontroller 440. As the temperature of valve 475 changes, new Vin targets may be determined in similar fashion.

At 700, Vin may be sensed (using an analog-digital (A/D) converter included in microcontroller 440) and compared with the target Vin obtained from the lookup table. If Vin is less than the Vin target, the power conversion duty cycle for high-efficiency DC-DC converter 335 may be decreased at 730. In this situation, more of the power supplied by thermo-electric device 210 will be diverted from high-efficiency DC-DC converter 335 to valve 475, which, in turn, will increase Vin so as to restore Vin to the Vin target for valve 475 obtained from the lookup table. After decreasing the power conversion duty cycle, Vdd may be sensed (using an A/D converter) and compared to a lower operating threshold for microcontroller 440 at 735. If Vdd is below the lower operating threshold, microcontroller 440 may suspend certain functions of the thermally powered circuit, such as, for example, an LED display. If Vdd is above the lower operating threshold, method 600 may then return to 690 and microcontroller 440 may wait for the predetermined period of time before determining a target Vin and sensing the Vin of valve 475 again.

If Vin is above the Vin target at 700, Vdd may be sensed and compared with the target operating threshold of microcontroller 440 at 705. If Vdd is less than the target operating threshold, a power conversion duty cycle for high-efficiency DC-DC converter 335 may be increased (e.g. increasing the duty cycle of a pulse-width-modulated (PWM) signal driving the gate of FET 436). This will divert more of the power supplied by thermo-electric device 210 from valve 475 to high-efficiency DC-DC converter 335, which, in turn, will increase Vdd so as to restore Vdd to the target operating voltage for microcontroller 440. Method 600 may then return to 690 and the microcontroller may wait for the predetermined period of time before determining a target Vin and sensing the Vin of valve 475 again.

If the sensed Vdd is above the target operating threshold of microcontroller 440, microcontroller 440 may, at 710, resume any functions that were suspended at 740. The sensed Vdd may then be compared to an upper operating threshold for microcontroller 440 at 715. If Vdd is above the upper operating threshold, the power conversion duty cycle for high-efficiency DC-DC converter 335 may be decreased at 730 to divert more of the power supplied by thermo-electric device 210 from high-efficiency DC-DC converter 335 to valve 475. Method 600 may then return to 690, and microcontroller 440 may wait for the predetermined period of time before determining a target Vin and sensing the Vin of valve 475 again. If Vdd is below the upper operating threshold, method 600 may immediately return to 690.

While certain features of the invention have been illustrated and described herein, many modifications, substitutions, changes and equivalents will now occur to those skilled in the art. It is, therefore, to be understood that the appended claims are intended to cover all such modifications and changes as fall within the true spirit of the invention.

What is claimed is:

1. A power management system comprising:
   a power converter for converting a thermally generated voltage, wherein the power converter comprises a low-voltage direct current to direct current voltage converter (DC-DC converter), and a high-efficiency DC-DC converter coupled with the low-voltage DC-DC converter;
   a charge storage circuit coupled with the low-voltage DC-DC converter and the high-efficiency DC-DC converter for storing converted electrical energy; and
   a programmable controller circuit coupled with the high-efficiency DC-DC converter, the low-voltage DC-DC converter, and the charge storage circuit, wherein the controller circuit substantially controls operation of the power management system when a voltage potential of the converted electrical energy stored by the charge storage circuit is greater than a first threshold value.

2. The power management system of claim 1, wherein the controller circuit is coupled with the low-voltage DC-DC converter via a voltage generation circuit for disabling the low-voltage DC-DC converter when the voltage potential of the converted electrical energy stored by the charge storage circuit is greater than a second threshold value.

3. The power management system of claim 2, wherein the voltage generation circuit comprises a charge pump circuit.

4. The power management system of claim 3, wherein the charge pump circuit comprises a negative charge pump and the low-voltage DC-DC converter is disabled via a depletion mode transistor included in a feedback loop of the low-voltage DC-DC converter, the depletion mode transistor having a gate terminal coupled with the negative charge pump.

5. The power management system of claim 1, wherein the low-voltage DC-DC converter comprises:
   a transformer having a positive terminal of its primary windings coupled with a negative terminal of its secondary windings;
   an electronic switch for completing a feedback loop of the low-voltage DC-DC converter and for disabling the low-voltage DC-DC converter, a control terminal of the electronic switch being coupled with a negative terminal of the primary windings;
   a capacitor coupled with, and between, a control terminal of the electronic switch and a positive terminal of the secondary windings; and
   a rectifying diode having its anode coupled with the positive terminal of the secondary windings and the capacitor.

6. The power management system of claim 5, wherein the transformer comprises a magnetic core having a spool-shaped configuration, the secondary windings being wrapped substantially evenly over a cylindrical center portion of the core, and the primary windings being wrapped substantially evenly, directly over the secondary windings.

7. The power management system of claim 6, wherein a ratio of turns of the primary winding to turns of the secondary winding is approximately one to thirty.

8. The power management system of claim 1, wherein the high-efficiency DC-DC converter comprises an inductor coupled with the thermo-electric device, a field effect transistor (FET) switch device coupled with the inductor and the controller, and a rectifying diode coupled with the inductor and the step-up switch.

9. The power management system of claim 1, wherein the charge storage circuit comprises:
   a first capacitor having a first terminal coupled with an electrical ground and a second terminal coupled with a power supply terminal of the controller circuit, an output terminal of the low-voltage DC-DC converter and an output terminal of the high-efficiency DC-DC converter; and
   a second capacitor that is relatively larger than the first capacitor having a first terminal coupled with an input/output (I/O) channel of the controller via a resistive element and a second terminal coupled with the power supply terminal of the controller circuit and the output terminals of the low-voltage DC-DC converter and the high-efficiency DC-DC converter.

10. The power management system of claim 9, wherein the I/O channel is actively controlled by the controller to facilitate charging of the second capacitor.

11. The power management system of claim 1, wherein the controller circuit comprises a programmable microcontroller device that includes:
    an analog-digital conversion circuit;
    a timer circuit;
    a pulse-width modulated output channel;
    a power supply voltage sensing circuit;
    a temperature sensing circuit; and
    a low-power mode.

12. The power management system of claim 11, wherein the microcontroller device is an ultra-low power microcontroller.

13. The power management system of claim 1, further comprising a valve control circuit coupled with the controller and an input voltage terminal of the power management system, wherein the valve control circuit comprises one or more valve drivers and one or more associated gas valves, the valve drivers having a control terminal coupled with the controller such that the associated gas valves are opened and closed based, at least in part, on electrical signals generated by the controller.

14. The power management system of claim 1, further comprising a thermopile device coupled with the low-voltage DC-DC converter and the high-efficiency DC-DC converter such that the thermopile supplies a to-be-converted thermally generated voltage.

15. A power management system comprising:
    a thermo-electric device;
    a low-voltage direct current to direct current voltage converter (DC-DC converter) coupled with the thermo-electric device;
    a high-efficiency DC-DC converter coupled with the thermo-electric device and the low-voltage DC-DC converter;
    a charge storage circuit coupled with the low-voltage DC-DC converter and the high-efficiency DC-DC converter;
    a voltage generation circuit coupled with the low-voltage DC-DC converter and the high-efficiency DC-DC converter, wherein the voltage generation circuit, in operation, disables the low-voltage DC-DC converter, and
    a programmable controller coupled with the charge storage circuit, the voltage generation circuit and the high-efficiency DC-DC converter, wherein the programmable controller substantially controls the operation of the charge storage circuit, the high-efficiency DC-DC converter and the voltage generation circuit.

16. The power management system of claim 15, wherein the thermo-electric device comprises a thermopile device.

17. The power management system of claim 15, wherein the low-voltage DC-DC converter comprises a transformer having primary windings and secondary windings, the primary and secondary windings being coupled with one of a depletion mode field effect transistor (FET) and a junction field effect transistor (J-FET) such that a thermal voltage generated by the thermo-electric device is converted by the low-voltage DC-DC converter using a positive feedback loop.

18. The power management system of claim 17, wherein a positive terminal of the primary windings is coupled with a negative terminal of the secondary windings to form the positive feedback loop.

19. The power management system of claim 15, wherein the high-efficiency DC-DC converter comprises a boost converter including:
an inductor coupled with the thermo-electric device;
a switch device coupled with the inductor and the controller; and
a rectifying device coupled with the inductor, the switch and the charge storage circuit.

20. The power management system of claim 15, wherein the charge storage circuit comprises:
a first, relatively small capacitor for storing electrical energy converted primarily by the low-voltage DC-DC converter; and
a second, relatively large capacitor for storing electrical energy converted primarily by the high-efficiency DC-DC converter, wherein storage of electrical energy on the second capacitor is substantially controlled by an I/O channel of the controller via a resistive element.

21. The power management system of claim 15, wherein the voltage generation circuit comprise a charge pump circuit coupled with a semiconductor switch device included in the low-voltage DC-DC converter for disabling the low-voltage DC-DC converter.

22. The power management system of claim 21, wherein the semiconductor switch device comprises one of a depletion mode field effect transistor (FET) and a J-FET and the charge pump is a negative charge pump coupled with a gate of the semiconductor switch device.

23. The power management system of claim 15, wherein the controller is an ultra-low power microcontroller.

24. The power management system of claim 23, wherein the microcontroller comprises:
an analog to digital (A/D) conversion circuit;
a timer circuit;
at least one pulse-width-modulated (PWM) output channel;
a power supply voltage sensing circuit;
a temperature sensing circuit, and
a low-voltage function mode.

25. The power management system of claim 24, wherein a PWM output channel is coupled with the voltage generation circuit for disabling the low-voltage DC-DC converter and the high-efficiency DC-DC converter for operating a step up switch device, and an I/O channel is coupled with the charge storage circuit for controlling storage of converted electrical energy.

26. A method comprising:
generating a first voltage potential by converting thermal energy from a thermal energy source to electrical energy;
converting the first voltage potential to a second voltage potential using a low-voltage direct current to direct current voltage converter (DC-DC converter) and storing the second voltage potential using a first charge storage device of a charge storage circuit;
activating a controller circuit;
converting the first voltage potential to a third voltage potential using the low-voltage DC-DC converter and storing the third voltage potential using the first charge storage device;
setting an initial value for a variable time constant for charging a second charge storage device of the charge storage circuit;
disabling the first DC-DC converter; and
converting the first voltage potential to a fourth voltage potential using a high-efficiency DC-DC converter and storing the fourth voltage potential using the first and second charge storage devices, wherein storing the fourth voltage potential is based, at least in part, on the variable time constant.

27. The method of claim 26, wherein generating the first voltage potential comprises converting thermal energy using a thermopile device.

28. The method of claim 26, wherein the low-voltage DC-DC converter comprises a transformer based self-starting, low-voltage oscillator.

29. The method of claim 26, wherein the first and second charge storage devices comprise capacitors, the first capacitor being a relatively small capacitor as compared to the second capacitor, the second capacitor being coupled in series with a resistive element and an I/O channel such that the second capacitor is charged based on an output signal of the I/O channel.

30. The method of claim 29, wherein the initial time constant is approximately ten percent of a discharge time constant for the first capacitor.

31. The method of claim 30, further comprising:
sensing an initial voltage on a power supply channel of the controller;
charging the second capacitor using the initial variable charging constant if the first voltage is above a first threshold;
sensing a comparison voltage on the power supply channel at predetermined intervals;
comparing the comparison voltage with the initial voltage; and
doubling the variable time constant if the comparison voltage is within a predetermined percentage of the initial voltage.

32. The method of claim 31, further comprising setting the variable time constant to one-hundred percent if doubling the variable time constant results in a value greater than a charging time constant of the second capacitor.

33. The method of claim 26, wherein the second voltage potential comprises a brown-out voltage of the controller.

34. The method of claim 26, wherein disabling the first DC-DC converter comprises pumping a negative charge pump circuit with an output channel of the controller.

35. The method of claim 34, wherein the third voltage potential comprises a switching voltage threshold for transistors included in the charge pump circuit.

36. The method of claim 26, wherein the fourth voltage potential comprises a target operating voltage for the controller.

37. A method of managing a thermally powered circuit comprising:
converting a thermal voltage potential from a thermal voltage source to a power supply operating target voltage potential of a controller circuit using a low-voltage DC-DC converter to perform a first part of the conversion and a high-efficiency DC-DC converter to perform a second part of the conversion;
opening a valve with a current supplied from the thermal voltage produced by the thermal voltage source;
waiting a predetermined period of time;
sensing an operating temperature of a gas valve coupled with the thermal voltage source;
determining a target input voltage for holding the valve open based on the operating temperature;
sensing an input voltage of the valve;
comparing the input voltage with the target input voltage; and
modifying a power conversion duty cycle of the high-efficiency DC-DC converter based on the comparison of the input voltage with the target input voltage.

38. The method of claim 37, wherein modifying the power conversion duty cycle of the high-efficiency DC-DC converter comprises increasing the power conversion duty cycle when the input voltage exceeds the target input voltage and a power supply voltage of the controller circuit is below the power supply operating target for the controller circuit.

39. The method of claim 37, wherein modifying the power conversion duty cycle of the high-efficiency DC-DC converter comprises decreasing the power conversion duty cycle of high-efficiency DC-DC converter when the input voltage is less than the target input voltage.

40. The method of claim 39, further comprising:
sensing a power supply voltage of the controller circuit;
comparing the power supply voltage with a power supply lower operating threshold; and
suspending one or more functions of the controller if the power supply voltage is less than the power supply lower operating threshold.

41. The method of claim 40, further comprising:
waiting the predetermined period of time;
sensing the operating temperature of the gas valve;
determining the target input voltage for holding the valve open based on the operating temperature;
sensing the input voltage of the valve;
comparing the input voltage with the target input voltage;
sensing the power supply voltage of the controller;
comparing the power supply voltage with the power supply operating target;
resuming one or more of the suspended functions if the power supply voltage is greater than the power supply operating target;
comparing the power supply voltage with a power supply upper threshold; and
decreasing the power conversion duty cycle of the high-efficiency DC-DC converter if the power supply voltage is greater than the power supply upper threshold.

42. The method of claim 37, further comprising:
sensing a power supply voltage of the controller;
comparing the power supply voltage with the power supply operating target;
resuming one or more suspended functions of the controller if the power supply voltage is greater than the power supply operating target;
comparing the power supply voltage with a power supply upper threshold; and
decreasing the power conversion duty cycle of the high-efficiency DC-DC converter if the power supply voltage is greater than the power supply upper threshold.

* * * * *